(12) United States Patent
Karjalainen et al.

(10) Patent No.: US 11,843,436 B2
(45) Date of Patent: Dec. 12, 2023

(54) ASSIGNING RESOURCES TO PORTS BASED ON COHERENCE

(71) Applicant: NOKIA TECHNOLOGIES OY, Espoo (FI)

(72) Inventors: Juha Pekka Karjalainen, Oulu (FI); Sami-Jukka Hakola, Kempele (FI); Timo Koskela, Oulu (FI); Jorma Johannes Kaikkonen, Oulu (FI); Antti Tölli, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/755,704

(22) PCT Filed: Nov. 6, 2020

(86) PCT No.: PCT/EP2020/081313
§ 371 (c)(1),
(2) Date: May 5, 2022

(87) PCT Pub. No.: WO2021/089793
PCT Pub. Date: May 14, 2021

(65) Prior Publication Data
US 2022/0393744 A1 Dec. 8, 2022

Related U.S. Application Data

(60) Provisional application No. 62/933,098, filed on Nov. 8, 2019.

(51) Int. Cl.
*H04B 7/06* (2006.01)
*H04B 7/0456* (2017.01)

(52) U.S. Cl.
CPC ........... *H04B 7/0639* (2013.01); *H04B 7/046* (2013.01); *H04B 7/0697* (2013.01)

(58) Field of Classification Search
CPC ..... H04B 7/0639; H04B 7/046; H04B 7/0697
See application file for complete search history.

(56) References Cited

U.S. PATENT DOCUMENTS

2018/0183503 A1\* 6/2018 Rahman ................ H04W 72/23
2019/0081671 A1 3/2019 Yang et al.

FOREIGN PATENT DOCUMENTS

WO 2019096843 A1 5/2019

OTHER PUBLICATIONS

International Search Report and Written Opinion for International Application No. PCT/EP2020/081313, dated Jan. 13, 2021, 10 pages.

(Continued)

*Primary Examiner* — Curtis B Odom
(74) *Attorney, Agent, or Firm* — Brake Hughes Bellermann LLP

(57) ABSTRACT

A method can include transmitting, by a user equipment to a base station, coherence information indicating, based on precoding to be performed in association with transmission, whether multiple transmission signals to be transmitted via multiple transmission ports will be coherent with each other, receiving, from the base station, a transmission indication message, the transmission indication message assigning uplink transmission resources and coherence information to the multiple transmission ports, and transmitting, to the base station via the assigned uplink transmission resources, the multiple transmission signals via the multiple transmission ports.

20 Claims, 7 Drawing Sheets

(56) References Cited

OTHER PUBLICATIONS

Mehta et al., "Antenna selection in LTE: from motivation to specification," IEEE Communications Magazine, vol. 50, No. 10, Oct. 2012, pp. 144-150.
3GPP TSG RAN Meeting #80, RP-181453; "WI Proposal on NR MIMO Enhancements"; Source: Samsung; Agenda Item: 9.1.1; La Jolla, California, USA; Jun. 11-14, 2018; 5 pages.
3GPP TS 38.211, V15.7.0; 3rd Generation Partnership Project; Technical Specification Group Radio Access Network; NR; Physical channels and modulation (Release 15); Sep. 2019; 97 pages.
3GPP TS 38.212, V15.7.0; 3rd Generation Partnership Project; Technical Specification Group Radio Access Network; NR; Multiplexing and channel coding (Release 15); Sep. 2019; 101 pages.
3GPP TS 38.214, V15.7.0; 3rd Generation Partnership Project; Technical Specification Group Radio Access Network; NR; Physical layer procedures for data (Release 15); Sep. 2019; 106 pages.
3GPP TS 38.331, V15.7.0; 3rd Generation Partnership Project; Technical Specification Group Radio Access Network; NR; Radio Resource Control (RRC) protocol specification (Release 15); Sep. 2019; 527 pages.
3GPP TSG RAN Meeting #80, RP-181453; "Work Item Proposal on NR MIMO Enhancements"; Source: Samsung; Agenda Item: 9.1.1; La Jolla, California, USA; Jun. 11-14, 2018; 5 pages.
3GPP TS 38.211, V17.4.0; 3rd Generation Partnership Project; Technical Specification Group Radio Access Network; NR; Physical channels and modulation (Release 17); Dec. 2022; 136 pages.
3GPP TS 38.212, V17.5.0; 3rd Generation Partnership Project; Technical Specification Group Radio Access Network; NR; Multiplexing and channel coding (Release 17); Mar. 2023; 203 pages.
3GPP TS 38.214, V17.5.0; 3rd Generation Partnership Project; Technical Specification Group Radio Access Network; NR; Physical layer procedures for data (Release 17); Mar. 2023; 231 pages.

* cited by examiner

| Bit Field 302 | SRI 304 | Bit Field 306 | SRI 308 | Bit Field 310 | SRI 312 | UE AP 314 |
|---|---|---|---|---|---|---|
| 0 | 0 | 0 | 0 | 0 | 0 | 4 |
| 1 | 1 | 1 | 1 | 1 | 1 | 3 |
| - | - | 2 | 2 | 2 | 2 | 2 |
| - | - | 3 | reserved | 3 | 3 | 1 |

| Bit Field 502 | SRI 504 | Bit Field 506 |
|---|---|---|
| 0 | 0 | 1 |
| 1 | 1 | 2 |
| 2 | 2 | 3 |
| 3 | 3 | 4 |
| 4 | 0, 1 | 1, 2 |
| 5 | 0, 2 | 1, 3 |
| 6 | 0, 3 | 1, 4 |
| 7 | 1, 2 | 2, 3 |
| 8 | 1, 3 | 2, 4 |
| 9 | 2, 3 | 3, 4 |
| 10-15 | reserved | reserved |

FIG. 5

| Bit Field 502 | SRI 604 | UE AP 606 |
|---|---|---|
| 0 | 0 | 4 |
| | 1 | 3 |
| | 2 | 2 |
| | 3 | 1 |

FIG. 6

ASSIGNING RESOURCES TO PORTS BASED ON COHERENCE

CROSS-REFERENCE TO RELATED APPLICATIONS

This application is a national stage entry of International Application No. PCT/EP2020/081313, filed Nov. 6, 2020, entitled "ASSIGNING RESOURCES TO PORTS BASED ON COHERENCE" which claims the benefit of priority of U.S. Provisional Application No. 62/933,098, filed Nov. 8, 2019, both of which are hereby incorporated by reference in their entireties.

TECHNICAL FIELD

This description relates to wireless communication.

BACKGROUND

In cellular communication networks, user equipments can include multiple antenna ports. The user equipments can transmit signals via some of the antenna ports, and can receive signals via some of the antenna ports.

SUMMARY

A user equipment can indicate, to a base station, coherence information indicating which antenna ports can transmit signals coherently with other antenna ports. The base station can assign uplink transmission resources to the user equipment based on the coherence information, enabling the user equipment to transmit signals to the base station coherently via multiple antenna ports. The user equipment can transmit signals to the base station via multiple antenna ports.

According to an example, a method can comprise transmitting, by a user equipment to a base station, coherence information indicating, based on precoding to be performed in association with transmission, whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; receiving, from the base station, a transmission indication message, the transmission indication message assigning uplink transmission resources and coherence information to the first transmission port, the second transmission port, and the third transmission port; and transmitting, to the base station via the assigned uplink transmission resources, the first transmission signal via the first transmission port, the second transmission signal via the second transmission port, and the third transmission signal via the third transmission port, the transmitting including precoding the first transmission signal, the second transmission signal, and the third transmission signal.

According to an example, a method can comprise receiving, by a base station from a user equipment, coherence information indicating whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; generating a transmission indication message based on the coherence information, the transmission indication message assigning resources to the first transmission port, the second transmission port, and the third transmission port so that the first transmission port, the second transmission port, and the third transmission port can coherently transmit the first transmission signal, the second transmission signal, and the third transmission signal; sending the transmission indication message to the user equipment; and receiving the first transmission signal, the second transmission signal, and the third transmission signal from the user equipment.

According to an example, a non-transitory computer readable storage medium can comprise instructions stored thereon that, when executed by at least one processor, are configured to cause a computing system to transmit, to a base station, coherence information indicating, based on precoding to be performed in association with transmission, whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; receive, from the base station, a transmission indication message, the transmission indication message assigning uplink transmission resources and coherence information to the first transmission port, the second transmission port, and the third transmission port; and transmit, to the base station via the assigned uplink transmission resources, the first transmission signal via the first transmission port, the second transmission signal via the second transmission port, and the third transmission signal via the third transmission port, the transmitting including precoding the first transmission signal, the second transmission signal, and the third transmission signal.

According to an example, a non-transitory computer readable storage medium can comprise instructions stored thereon that, when executed by at least one processor, are configured to cause a computing system to receive, from a user equipment, coherence information indicating whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; generate a transmission indication message based on the coherence information, the transmission indication message assigning resources to the first transmission port, the second transmission port, and the third transmission port so that the first transmission port, the second transmission port, and the third transmission port can coherently transmit the first transmission signal, the second transmission signal, and the third transmission signal; send the transmission indication message to the user equipment; and receive the first transmission signal, the second transmission signal, and the third transmission signal from the user equipment.

According to an example, a user equipment can comprise at least one processor; and a non-transitory computer readable storage medium comprising instructions stored thereon that, when executed by at least one processor, are configured to cause the user equipment to transmit, to a base station, coherence information indicating, based on precoding to be performed in association with transmission, whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; receive, from the base station, a transmission indication message, the transmission indication message assigning uplink transmission resources and coherence information to the first transmission port, the second transmission port, and the third transmission port; and transmit, to the base station via the assigned uplink transmission resources, the first transmission signal via the first transmission port, the second transmission signal via the second transmission port, and the third transmission signal via the third transmission port, the transmitting including precoding the first transmission signal, the second transmission signal, and the third transmission signal.

According to an example, a base station can comprise at least one processor; and a non-transitory computer readable storage medium comprising instructions stored thereon that, when executed by at least one processor, are configured to cause the base station to receive, from a user equipment, coherence information indicating whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port; generate a transmission indication message based on the coherence information, the transmission indication message assigning resources to the first transmission port, the second transmission port, and the third transmission port so that the first transmission port, the second transmission port, and the third transmission port can coherently transmit the first transmission signal, the second transmission signal, and the third transmission signal; send the transmission indication message to the user equipment; and receive the first transmission signal, the second transmission signal, and the third transmission signal from the user equipment.

The details of one or more implementations are set forth in the accompanying drawings and the description below. Other features will be apparent from the description and drawings, and from the claims.

BRIEF DESCRIPTION OF THE DRAWINGS

FIG. 5 is a transmission indication table according to an example embodiment.

FIG. 6 is a transmission indication table according to an example embodiment.

DETAILED DESCRIPTION

Figure 1:
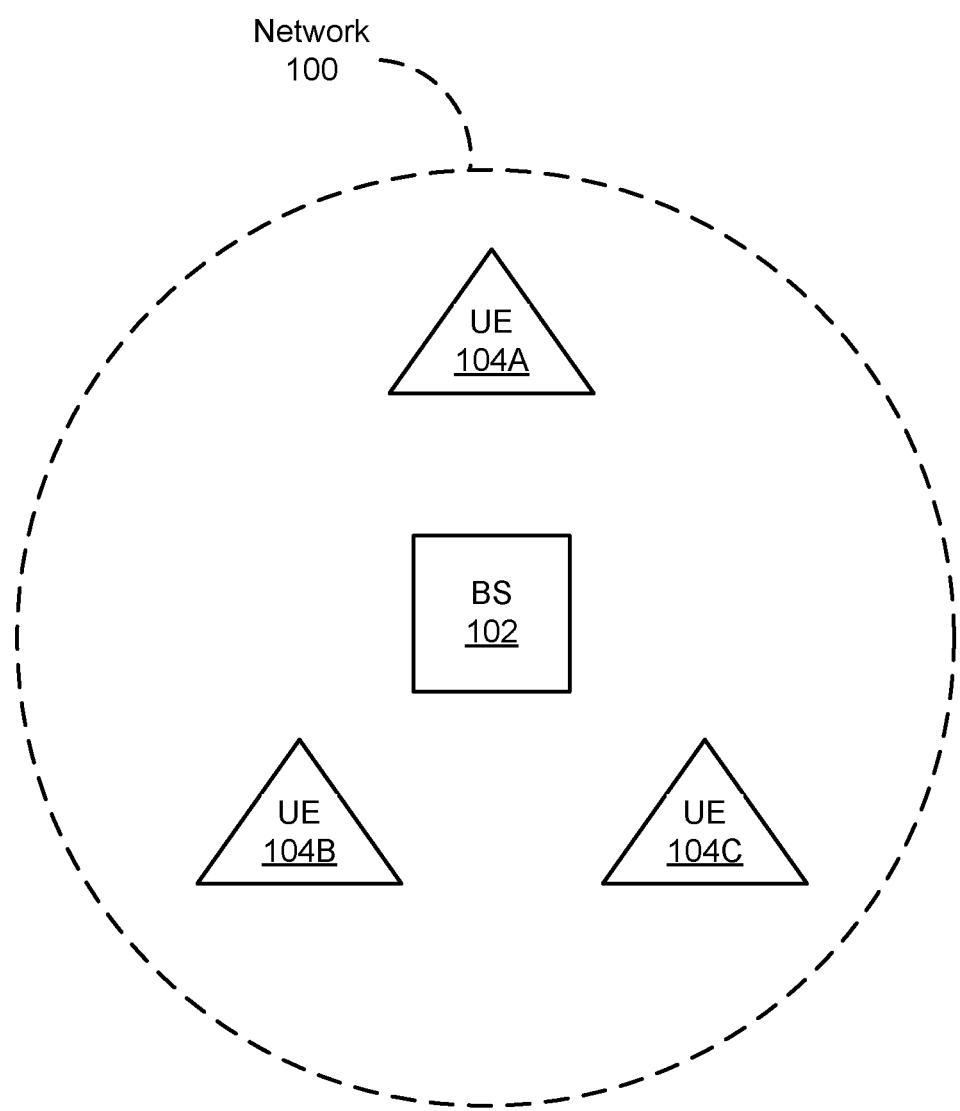
FIG. 1 is a diagram of a wireless network according to an example embodiment.

FIG. 1 is a diagram of a wireless network 100 according to an example embodiment. In the wireless network 100 of FIG. 1, user equipments (UEs) 104A, 104B, 104C, which may also be referred to as mobile stations (MSs) or user devices, and which can be referred to as user equipments 104, may be connected (and in communication) with a base station (BS) 102, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. The base station 102 may also include or may be referred to as a RAN (radio access network) node, and may include a portion of a base station or a portion of a RAN node, such as (e.g., such as a centralized unit (CU) and/or a distributed unit (DU) in the case of a split BS). At least part of the functionalities of a BS (e.g., access point (AP), base station (BS) or (e) Node B (eNB), BS, RAN node) may also be carried out by any node, server or host which may be operably coupled to a transceiver, such as a remote radio head. Base station (or AP) 102 provides wireless coverage within a cell 136, including to user equipments 104. Although only three user equipments 104 are shown as being connected or attached to the base station 102 in FIG. 1, any number of user devices may be provided. Base station 102 can also be connected to a core network (not shown), such as via a Si interface or NG interface. This is merely one simple example of a wireless network, and others may be used.

The base station 102 is an example of a radio access network (RAN) node within a wireless network. The base station 102 may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, the base station 102, which can include a BS node (e.g., BS, eNB, gNB, CU/DU, . . . ) or a radio access network (RAN), may be part of a mobile telecommunication system. A RAN (radio access network) may include one or more base stations or RAN nodes that implement a radio access technology, e.g., to allow one or more user equipments to have access to a network or core network. Thus, for example, the RAN (RAN nodes, such as base stations or gNBs) may reside between one or more user devices or user equipments and a core network. According to an example embodiment, each RAN node (e.g., base station, eNB, gNB, CU/DU, . . . ) or base station may provide one or more wireless communication services for one or more user equipments or user devices, e.g., to allow the user equipments to have wireless access to a network, via the RAN node. Each RAN node or base station may perform or provide wireless communication services, e.g., such as allowing user equipments or user devices to establish a wireless connection to the RAN node, and sending data to and/or receiving data from one or more of the user equipments. For example, after establishing a connection to a user equipment, a RAN node (e.g., BS, eNB, gNB, CU/DU, . . . ) may forward data to the user equipment that is received from a network or the core network, and/or forward data received from the user equipment to the network or core network. RAN nodes (e.g., base station, eNB, gNB, CU/DU, . . . ) may perform a wide variety of other wireless functions or services, e.g., such as broadcasting control information (e.g., such as system information) to user equipments, paging user equipments when there is data to be delivered to the user equipment, assisting in handover of a user equipment between cells, scheduling of resources for uplink data transmission from the user equipment(s) and downlink data transmission to user equipment(s), sending control information to configure one or more user equipments, and the like. These are a few examples of one or more functions that a RAN node or base station may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink-only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), the core network may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or Narrow Band IoT (NB-IoT) user devices, enhanced mobile broadband (eMBB), and ultra-reliable and low-latency communications (URLLC). Many of these new 5G (NR)—related applications may require generally higher performance than previous wireless networks.

The various example embodiments may be applied to a wide variety of wireless technologies or wireless networks, such as LTE, L 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Network nodes (e.g., base stations or gNBs, user equipments or user devices, relay stations or relay nodes, or other network node) may use beamforming, in which a set of antenna weights may be applied to generate a specific antenna beam width and shape for transmitting or receiving (e.g., in order to obtain a beamforming gain), instead of using an omnidirectional antenna. An antenna (or antenna array) may include multiple antenna elements, where a specific beam (e.g., including a beam direction and/or beam width) may be generated or obtained by applying a set of antenna weights (e.g., each antenna weight including an amplitude and phase) to the antenna array, with a different weight applied to each antenna element. For example, a direction of the beam from a phased antenna array may be changed by adjusting the phase of the signal applied to each of the elements in the antenna array. Thus, for example, a transmit beam may be generated for transmitting a signal, and a receive beam may be generated for receiving a signal.

Figure 2:
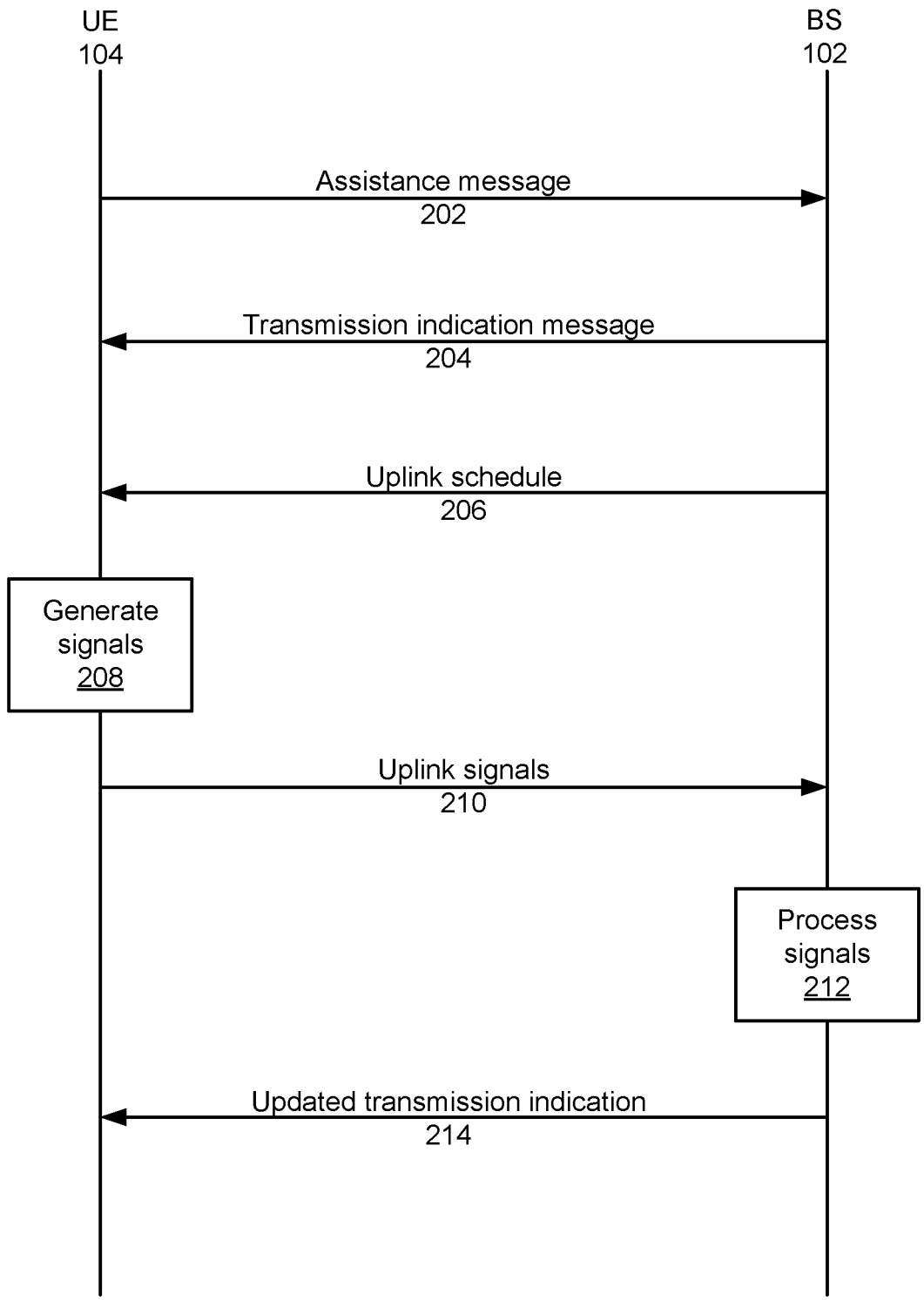
FIG. 2 is a timing diagram showing communications between, and actions performed by, a user equipment and a base station according to an example embodiment.

FIG. 2 is a timing diagram showing communications between, and actions performed by, a user equipment 104 and a base station 102 according to an example embodiment. The use equipment 104 is an example of one of the user equipments 104A, 104B, 104C shown and described with respect to FIG. 1. The user equipment 104 can include multiple antenna ports. The multiple antenna ports included in the user equipment 104 can enable the user equipment 104 to perform multiple-input multiple-output (MIMO) communication. In some examples, some of the antenna ports included in the user equipment 104 can only transmit data and/or signals (and can be considered transmission ports and/or transmission antenna ports), and some of the antenna ports included in the user equipment 104 can only receive data and/or signals (and can be considered reception ports and/or reception antenna ports). In some examples, the user equipment 104 can transmit different signals out of each of the transmission antenna ports. The user equipment 104 can have an asymmetric transmission and reception antenna port configuration, such as by including a greater number of reception antenna ports, and/or antenna ports that can only receive data and/or signals, than transmission antenna ports, and/or antenna ports that can only transmit data and/or signals.

The user equipment 104 can precode data and/or signals in association with transmitting the data and/or signals. The user equipment can precode the data and/or control and/or reference signal and/or signals by, for example, codebook based precoding techniques or non-codebook based precoding techniques. The user equipment 104 can transmit, via the transmission antenna ports, precoded signals, such as data signals, control signals, reference signals, sounding reference signals, demodulation reference signals and/or phase tracking reference signals, as non-limiting examples.

Precoding may include applying a set of weights at a transmitter to improve link throughput at a receiver, e.g., based on channel characteristics. For example, a base station 102 may use precoding to transmit data to a user equipment 104 (based on a precoder matrix or precoder vector for the user equipment 104). For example, a user equipment 104 may receive reference signals or pilot signals, and may determine a quantized version of a DL (downlink) channel estimate, and then provide the base station 102 with an indication of the quantized DL channel estimate. The base station may determine a precoder matrix based on the quantized channel estimate, where the precoder matrix may be used to focus or direct transmitted signal energy in the best channel direction for the user equipment 104. Also, each user equipment 104 may use a precoder matrix/vector that may be determined, e.g., where the user equipment 104 may receive reference signals from the base station 102, determine a channel estimate of the DL channel, and then determine a precoder matrix for the UL channel based on the DL channel estimate and use of channel reciprocity between UL and DL channels. The channel reciprocity may be applied only when it is applicable, e.g., in time division duplexing (TDD) systems. For example, a precoder matrix may indicate antenna weights (e.g., an amplitude/gain and phase for each weight) to be applied to an antenna array and/or antenna ports of a transmitting wireless device.

As an illustrative example, a user equipment 104 may measure one or more signal parameters (e.g., link quality) of reference signals received from a base station 102, and may send a channel state information (CSI) report to the base station 102. The CSI report, may include, for example, one or more of a Rank Indicator (RI), which is a suitable number of transmission layers for a downlink (DL) transmission; a Precoder Matrix Indicator (PMI), which may indicate what a device (e.g., user equipment 104) estimates as a suitable precoder matrix based on the selected rank; and a Channel Quality Indication (or channel quality indicator) (CQI), which may express or indicate the base station-user equipment channel or link quality, as measured by the user equipment 104. The CQI may indicate what the user equipment estimates as a suitable channel coding rate and modulation scheme based on the selected precoder matrix.

The user equipment 104 can determine coherence information, such as which transmission antenna ports can transmit coherent precoded data and/or control and/or reference signal and/or signals. The user equipment can determine which transmission ports can transmit precoded data and/or control and/or reference signal and/or signals based on a precoding technique to be performed on the data and/or control and/or reference signal and/or signals, such as any codebook-based precoding technique or any non-codebook based precoding technique, and a spatial arrangement of the transmission antenna ports. In some examples, coherent transmission between two antenna ports can include transmitting data and/or control and/or reference signal and/or signals via the two antenna ports during overlapping symbols in time and/or overlapping frequency bands that can be successfully decoded by the base station 102.

In an example in which the user equipment 104 includes two transmission antenna ports, the user equipment 104 can determine whether a first transmission antenna port can coherently transmit data and/or control and/or reference signal and/or signals with a second transmission antenna port. In an example in which the user equipment 104 includes three transmission antenna ports, the user equipment 104 can determine whether a first transmission antenna port can coherently transmit data and/or control and/or reference signal and/or signals with a second transmission antenna port, whether the first transmission port can coherently transmit data and/or control and/or reference signal and/or signals with a third transmission antenna port, and whether the second transmission antenna port can coherently transmit data and/or control and/or reference signal and/or signals with the third transmission antenna port. In an example in which the user equipment 104 includes four transmission antenna ports, the user equipment 104 can also determine whether the first transmission antenna port can coherently transmit data and/or control and/or reference signal and/or signals with the fourth transmission antenna port, whether the second transmission antenna port can coherently transmit data and/or control and/or reference signal and/or signals with the fourth transmission antenna port, and whether the third transmission antenna port can coherently transmit data and/or control and/or reference signal and/or signals with the fourth transmission antenna port.

After determining which transmission antenna ports can coherently transmit data and/or control and/or reference signal and/or signals with each other, the user equipment 104 can send an assistance message 202 to the base station 102. The user equipment 104 can send the assistance message 202 to the base station 102 via, for example, an L1 or physical layer, a media access control (MAC) layer, or a radio resource control (RRC) layer. The assistance message 202 can indicate that the transmission antenna ports included in the user equipment 104 are capable of independently and/or jointly transmitting distinct, precoded data and/or control and/or reference signal and/or signals to the base station 104. The assistance message 202 can include coherence information, such as indicating whether the transmission antenna ports included in the user equipment 104 can coherently transmit precoded data and/or control and/or reference signal and/or signal with each other. The assistance message 202 can indicate whether each pair of transmission antenna ports included in the user equipment 104 can coherently transmit precoded data and/or control and/or reference signal and/or signal with each other.

The assistance message 202 can include explicit one-to-one associations between the transmission antenna ports included in the user equipment 104 and sounding reference signal resource indicators (SRIs). The SRIs can identify uplink communication resources for the transmission antenna ports to transmit data and/or control and/or reference signal and/or signals, such as frequency and time resources. A group of frequency and/or time resources identified by a single SRI and/or associated with a single transmission antenna port can be contiguous and/or non-contiguous. The indication included in the assistance message 202 of whether two transmission antenna ports can coherently transmit data and/or control and/or reference signal and/or signals can be based on the SRI associated with the respective antenna ports.

The assistance message 202 can cause the base station 104, which controls communication in the network 100, to be explicitly aware of the association of each transmission antenna port in the user equipment 104 with a respective SRI. The assistance message 202 can include at least one of explicit associations between transmission antenna ports included in the user equipment 104 and SRIs for a single transmission, explicit associations between transmission antenna ports included in the user equipment 104 and SRIs for simultaneous transmission, and transmission coherence information associated with one-to-one mappings between SRIs and transmission antenna ports included in the user equipment 104 (which can be indicated by a bit field of length K).

Based on the assistance message 202 and/or coherence information received from the user equipment 104, the base station 102 can generate a transmission indication message 204. The transmission indication message 204 can assign uplink transmission resources and/or coherence information for the transmission ports included in the user equipment 104, such as the first transmission antenna port, the second transmission antenna port, the third transmission antenna port, and/or the fourth transmission antenna port. The transmission indication message can include one-to-one and/or one-to-many associations between SRIs and antenna ports included in the user equipment 104, and/or coherence information with one-to-one mappings between SRIs and antenna ports included in the user equipment 104.

In some examples, the base station 102 can preconfigure the transmission indication message by RRC signaling. In some examples, the transmission indication message 204 can include a table, such as an enhanced SRI table or set of uplink transmission configuration indicator (TCI) states. In some examples, the enhanced SRI table or set of uplink TCI states, can include, in each row, a sounding resource signal (SRS) field, an SRI, a user equipment antenna port index, and/or transmission coherence information (which can be explicit or implicit). The base station 104 can send and/or transmit the transmission indication message 204 to the user equipment 104. The transmission indication message 204 can enable flexible uplink transmission configurations for user equipments with different transmission capabilities and/or for different network scenarios.

After sending the transmission indication message 204 to the user equipment 104, the base station 102 can send an uplink/downlink schedule 206 to the user equipment 104. The uplink/downlink schedule 206 can indicate time and frequency resources, and/or transmission antenna ports via which the user equipment 104 can send data and/or control and/or reference signal and/or signals to the base station 102. The uplink/downlink schedule 206 can trigger the user equipment 104 to transmit precoded data and/or control and/or reference signal and/or signals to the base station 102. The data and/or control and/or reference signal and/or signals can be precoded by either codebook- or non-codebook-based precoding techniques. The uplink transmissions of data and/or control and/or reference signal and/or signals can be via a physical uplink shared channel (PUSCH), a physical uplink control channel (PUCCH), a demodulation reference signal (DMRS), a sounding reference signal (SRS), and/or a phase-tracking reference signal (PTRS), as non-limiting examples. In some examples, the uplink schedule 206 can be included in the transmission indication message 204.

Based on and/or in response to receiving the transmission indication message 204 and/or uplink/downlink schedule 206 from the base station 102, the user equipment 104 can generate signals (208). The user equipment 104 can generate signals for transmission to the base station 102. The user equipment 104 can generate the signals for transmission via the SRIs and/or transmission antenna port(s) identified in the transmission indication message 204 and/or uplink/downlink schedule 206. The signals generated by the user equipment 104 can be precoded with or without a codebook. The signals generated by the user equipment can be PUSCH signals, PUCCH signals, DMRS signals, SRS, signals, and/or PTRS signals. In some examples, the signals, which can be uplink signals, generated by the user equipment 104, can be sequential in time. The user equipment 104 can encapsulate intra-cell and/or inter-cell interference awareness into uplink transmission via the transmission of uplink resources (e.g., DMRS of PUSCH, DMRS of PUSCH, SRS, PTRS) associated with antenna ports in the coherence information.

The user equipment 104 can transmit the generated uplink (UL) signals 210 to the base station 102. The user equipment 104 can transmit the uplink signals via the transmission antenna ports associated with the SRI(s) indicated in the transmission indication message 204. The user equipment 104 can transmits the uplink signals either sequentially and/or one at a time, or simultaneously. The user equipment 104 can transmit the uplink signals 210 with the coherence information included in the assistance message 202 and/or transmission indication message 204. The transmission of the uplink signals 210 with the coherence information included in the assistance message 202 and/or transmission indication message 204 can improve the quality of channel estimates of uplink SRS, DMRS, and/or PTRS.

The base station 102 can process the uplink signals 210 received from the user equipment 104 (212). The base station 102 can decode the uplink signals based on information about the precoding technique received via the assistance message 202 and/or based on information included in the transmission indication message 204 such as SRI indication information and/or coherence between transmission antenna ports. Based on the precoding information and/or SRI indication information, the base station 102 can obtain transmission precoding (e.g., interference mitigation, diversity, signal-to-noise-ration increase) in a spatial domain and/or repetition gains in time domain for the user equipment 104, increasing the data rate and reliability for uplink transmissions. The uplink transmission precoding and repetition gains can improve PUSCH transmission and/or PUCCH transmission and/or SRS transmission and/or DMRS transmission and/or PTRS transmission.

The base station 102 can send an updated transmission indication 214 to the user equipment 104. The updated transmission indication 214 can update and/or change the information included in the transmission indication message, such as by updating and/or changing the SRI indication table and/or set of UL TCI states. The base station 102 can send the updated transmission indication 214 to the user equipment 104 via MAC signaling, such as via a MAC control element (MAC CE).

Figures 3, 4:
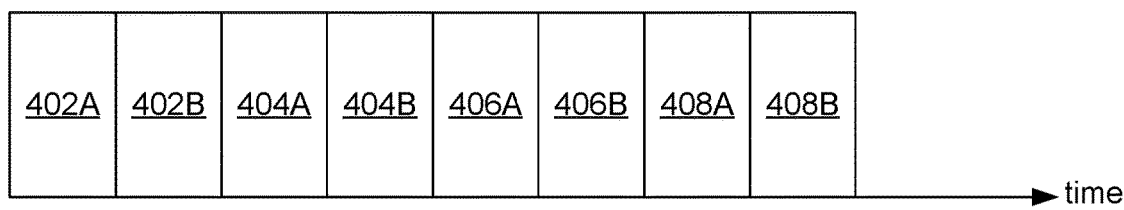
FIG. 3 is a transmission indication table according to an example embodiment.
FIG. 4 is a timing diagram showing resources for demodulation reference signals and physical uplink shared channels according to an example embodiment.

FIG. 3 is a transmission indication table 300 according to an example embodiment. This transmission indication table 300, which can be an enhanced SRI table, shows an example of an enhanced SRI indication framework with user equipment antenna port indication for non-codebook based single layer PUSCH transmission. In this example, the user equipment 104 can use only one transmission RF chain/antenna port (a user equipment transmission antenna port) out of four RF chains/antenna ports at a time. In this example, the base station 102 has configured, for each SRI resource, corresponding uplink DMRS and PUSCH resources. In some examples, the user equipment 104 can transmit via SRIs consecutively in time, in either increasing or decreasing order based on the identifier of the SRI.

FIG. 4 is a timing diagram showing resources for demodulation reference signals and physical uplink shared channels according to an example embodiment. This diagram show an example of possible SRI resource association with uplink DMRS resources 402A, 404A, 406A, 408A for each SRI and PUSCH resources 402B, 404B, 406B, 408B for each SRI. This is merely an example, and the chronological order of DMRS resources and PUSCH resources can be configured differently than the example shown in FIG. 4. In this example, the user equipment 104 has indicated assistance information for a network via RRC and/or MAC (e.g., MAC CE within PUSCH) and/or physical layer (such as a new payload in UCI being part of PUCCH) signaling association of SRI and UE antenna ports. Based on the assistance information about the association of SRIs with user equipment transmission antenna ports included in the assistance message 202, the base station 102 can be aware of the mapping between SRIs and the user equipments 104 transmission antenna ports. By RRC-signaling, the base station 102 can preconfigure, separately for each user equipment 104A, 104B, 104C, either an entire enhanced SRI indication table, or a sub-set(s) of an enhanced indication table, such as specific layers and/or resources.

Based on dynamic updates of the user equipment assistance information, which can be included in subsequent assistance messages, the base station 102 can update preconfigured elements in the enhanced SRI indication table 300 associated with the user equipment transmission antenna port information via MAC-level signalling (such as MAC CE as part of PDSCH). In some examples, the base station 102 can preconfigure, via RRC-signaling, dedicated parameter to combine multiple triggered non-codebook based PUSCH transmissions over different time instants associated with user equipment transmission antenna port specific non-codebook based PUSCH transmissions. An RRC-signaling parameter, such as TXCoherence, can define a number of consecutive DCI triggered PUSCH transmissions to be coherently combined for each SRS resource. Based on the user equipment assistance information, the base station 102 can trigger and/or prompt or instruct the user equipment 104 to perform non-codebook based PUSCH transmission via a user equipment transmission antenna port specifically, such as SRS field within DCI format 0_1 via PDCCH. For an example, upon the reception of SRS field equal to zero (0), the user equipment 104 can transmit uplink DMRS and uplink PUSCH resources with SRS resources index equal to zero (0), which is associated with user equipment transmission antenna port index equal to four (4), as shown in FIG. 3. When an RRC-configured parameter for combining, such as TXCoherence, is greater than one (1), transmission precoding and repetition gains can be attained for PUSCH transmission over different time instants, even with single antenna port transmission. A similar mechanism as for non-codebook based PUSCH transmission can also be applied for the non-codebook based PUCCH transmission with UE assistance information.

FIG. 5 is a transmission indication table 500 according to an example embodiment. The transmission indication table 500 is an example of an enhanced SRI indication table with user equipment antenna port information for two-layer, non-codebook based PUSCH transmission. In this example, the user equipment 104 can simultaneously transmit signals via only up to two TX RF chains (UE antenna ports) out of four TX RF chains included in the user equipment 104. Similar to single transmission for non-codebook based PUSCH, the user equipment 104 has sent network assistance information to the base station 104 in the assistance message 202 with explicit one-to-one and one-to-many user equipment transmission antenna port mappings with SRIs. The base station 102 can configure, for each SRI resource, corresponding uplink DMRS and PUSCH resources.

The base station 102 can preconfigure, by RRC-signaling separately for each user equipment 104A, 104B, 104C, either an entirely new enhanced SRI indication table, or a sub-set of an enhanced indication table, such as updating and/or enhancing specific layer(s) and/or resource(s). Similar to the example described with respect to FIG. 3, the base station 102 can update preconfigured elements in the enhanced SRI indication table 500 associated with transmission antenna port information with MAC-level signaling (such as via a MAC CE as part of PDSCH). The base station 102 can preconfigure, by RRC-signaling, a dedicated parameter to combine multiple triggered non-codebook based PUSCH transmissions over different time instants associated with user equipment transmission antenna port specific non-codebook based PUSCH transmissions. The RRC-signaling parameter, such as TXCoherence-PUSCH, can define a number of combined SRS triggered PUSCH transmissions (which can be either consecutive or non-consecutive). By using the assistance information included in the assistance message 202, the base station 102 can trigger the user equipment 102 to transmit non-codebook based PUSCH transmission via a specific user equipment transmission antenna port, such as SRS field within DCI format 0_1 via PDCCH. In some examples, in response to receiving an SRS field equal to three (3), the user equipment 104 can simultaneously transmit UL DMRS and UL PUSCH resources with two SRS resource indices, such as equal to zero (0) and three (3), that are associated with user equipment transmission antenna port indices one (1) and four (4). When an RRC parameter for combining, such as TXCoherence-PUSCH, is configured to be larger than one (1), transmission precoding and repetition gains can be attained for both PUSCH transmission layers even with single antenna port transmission. A similar mechanism as for non-codebook based PUSCH transmission can be also applied for non-codebook based PUCCH transmission with UE assistance information.

FIG. 6 is a transmission indication table 600 according to an example embodiment. The transmission indication table 600 is an example of an enhanced SRI indication framework with single SRS field, enabling consecutive transmission of uplink DMRS and PUSCH or PUCCH resources without the transmission of multiple separate DCIs. In this example, the user equipment 104 can transmit signals via a single transmission RF chain (which can also be considered a user equipment transmission antenna port) out of four RF chains included in the user equipment 104. The base station 102 can configure, for each SRI resource, corresponding uplink DMRS and/or PUSCH or PUSCH resources. Similar to the example described with respect to FIG. 5, the base station 102 can update preconfigured elements in the enhanced SRI indication table associated with user equipment transmission antenna port information with MAC-level signaling (such as via a MAC CE as part of PDSCH). In some examples, in response to the reception of an SRS field equal to zero (0), the user equipment 104 can transmit uplink DMRS and uplink PUSCH resources associated with four SRS resource indices equal to zero (0), one (1), two (2), and three (3), with user equipment transmission antenna port indices equal to four (4), three (3), two (2), and one (1), respectively, over four different preconfigured symbol time instants. When a single SRS field for PUSCH/PUCCH triggering is configured, the transmission of multiple DCI via PDCCH can be avoided by assuming implicit indication for TX coherence for PUSCH/PUCCH (such as which DMRS and PUSCH/PUCCH resources need to be combined). The transmission of multiple DCI via PDCCH can be performed without explicit RRC-level signaling related to transmission coherence of PUSCH/PUCCH.

Figure 7:
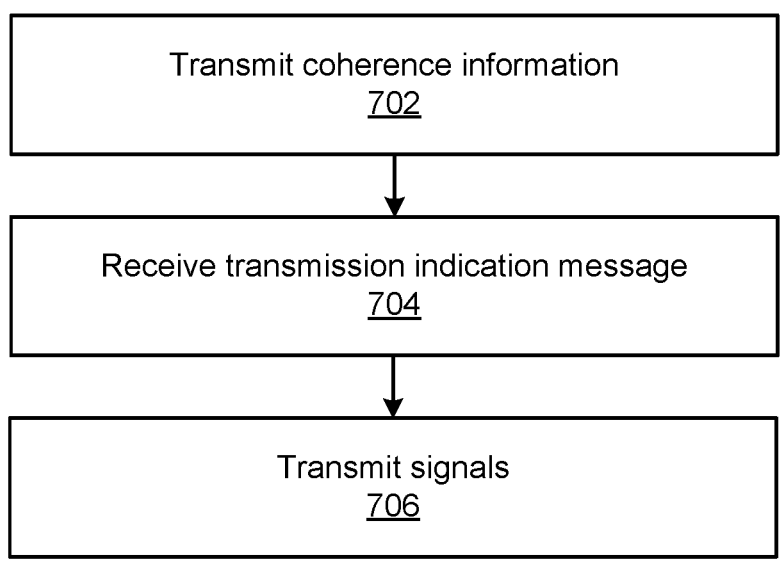
FIG. 7 is a flowchart showing a method performed by the user equipment according to an example embodiment.

FIG. 7 is a flowchart showing a method 700 performed by the user equipment 104 according to an example embodiment. The method 700 can include transmitting, by the user equipment 104 to the base station 102, coherence information (702), which can indicate, based on precoding to be performed in association with transmission, whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port. The method 700 can also include receiving, from the base station, a transmission indication message (704), the transmission indication message assigning uplink transmission resources and coherence information to the first transmission port, the second transmission port, and the third transmission port. The method 700 can also include transmitting signals (706), such as transmitting, to the base station via the assigned uplink transmission resources, the first transmission signal via the first transmission port, the second transmission signal via the second transmission port, and the third transmission signal via the third transmission port, the transmitting including precoding the first transmission signal, the second transmission signal, and the third transmission signal.

According to some examples, the first transmission port, the second transmission port, and the third transmission port can be configured to transmit the first transmission signal, the second transmission signal, and the third transmission signal simultaneously or sequentially.

According to some examples, the coherence information can be included in an assistance message that indicates transmission coherence associated with precoding to be performed in association with transmitting the first transmission signal, the second transmission signal, and the third transmission signal.

According to some examples, the method 700 can further comprise determining whether, based on the precoding to be performed in association with transmission, the first transmission signal to be transmitted via the first transmission port will be coherent with the second transmission signal to be transmitted via the second transmission port, whether the first transmission signal to be transmitted via the first transmission port will be coherent with the third transmission signal to be transmitted via the third transmission port, and whether the second transmission signal to be transmitted via the third transmission port will be coherent with the third transmission signal to be transmitted via the third transmission port; and precoding the first transmission signal, the second transmission signal, and the third transmission signal, in association with transmitting the first transmission signal, the second transmission signal, and the third transmission signal.

According to some examples, the first transmission signal can comprise at least one of a data signal, a control signal, a reference signal, a sounding reference signal, a demodulation reference signal, or a phase tracking reference signal.

According to some examples, the transmitting can comprise transmitting the first transmission signal via at least one of a physical uplink shared channel, a physical uplink control channel, or a physical random access channel.

According to some examples, the user equipment can comprise a greater number of reception ports than transmission ports.

According to some examples, the uplink transmission resources assigned to the first transmission port comprise multiple non-contiguous frequency slots.

According to some examples, the coherence information can indicate that the first transmission signal to be transmitted via the first transmission port would be coherent with the second transmission signal to be transmitted via the second transmission port; and the transmitting can comprise transmitting, based on the resource indication message, the first transmission signal via the first transmission port at a same time as transmitting the second transmission signal via the second transmission port.

According to some examples, the coherence information can indicate that the first transmission signal to be transmitted via the first transmission port would be incoherent with the third transmission signal to be transmitted via the third transmission port; and the transmitting can comprise transmitting, based on the resource indication message, the first transmission signal via the first transmission port at a different time than transmitting the third transmission signal via the third transmission.

According to some examples, the coherence information can indicate that the first transmission signal to be transmitted via the first transmission port would be coherent with the second transmission signal to be transmitted via the second transmission port; the coherence information can indicate that the first transmission signal to be transmitted via the first transmission port would be incoherent with the third transmission signal to be transmitted via the third transmission port; and the transmitting can comprise transmitting, based on the resource indication message, the first transmission signal via the first transmission port at a same time as transmitting the second transmission signal via the second transmission port and transmitting the first transmission signal via the first transmission port at a different time than transmitting the third transmission signal via the third transmission port.

Figure 8:
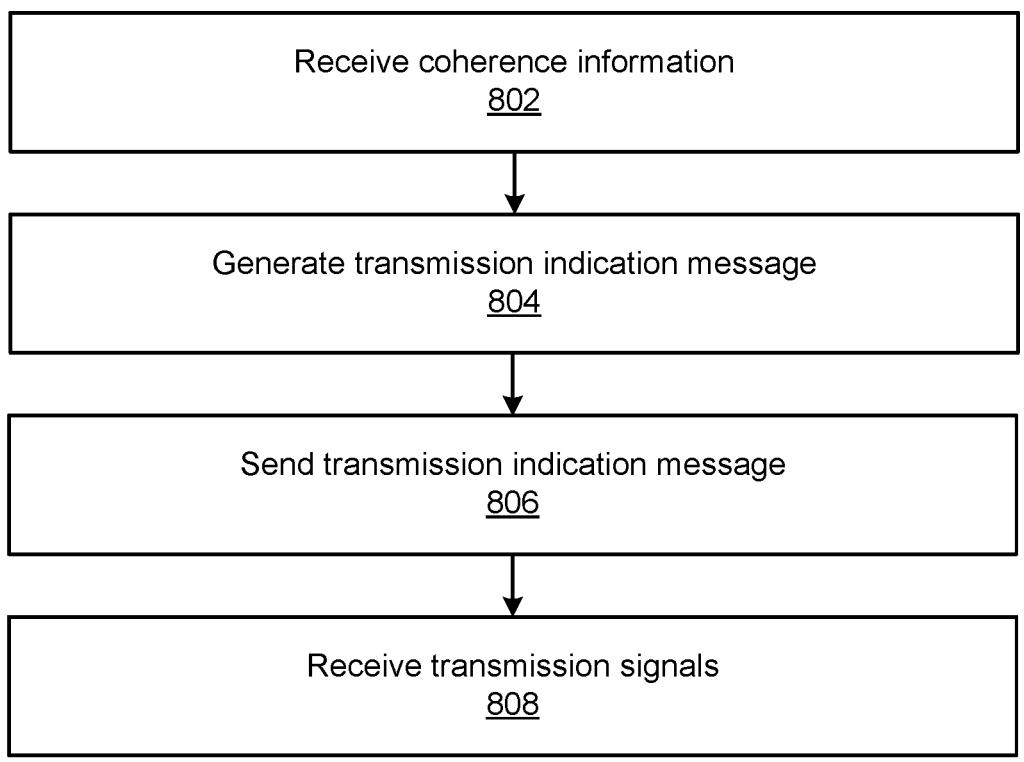
FIG. 8 is a flowchart showing a method performed by the base station according to an example embodiment.

FIG. 8 is a flowchart showing a method 800 performed by the base station 102 according to an example embodiment. The method 800 can include receiving, by the base station 102 from the user equipment 104, coherence information (802) indicating whether a first transmission signal to be transmitted via a first transmission port will be coherent with a second transmission signal to be transmitted via a second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port. The method 800 can also include generating a transmission indication message (804) based on the coherence information, the transmission indication message assigning resources to the first transmission port, the second transmission port, and the third transmission port so that the first transmission port, the second transmission port, and the third transmission port can coherently transmit the first transmission signal, the second transmission signal, and the third transmission signal. The method 800 can also include sending the transmission indication message to the user equipment (806). The method 800 can also include receiving the first transmission signal, the second transmission signal, and the third transmission signal from the user equipment (808).

According to some examples, the coherence information can be included in an assistance message that indicates precoding to be performed in association with transmission.

According to some examples, the first transmission signal can be precoded, the second transmission signal can be precoded, and the third transmission signal can be precoded.

According to some examples, the method 800 can further comprise decoding the first transmission signal, the second transmission signal, and the third transmission signal assignments of resources included in the transmission indication message.

Figure 9:
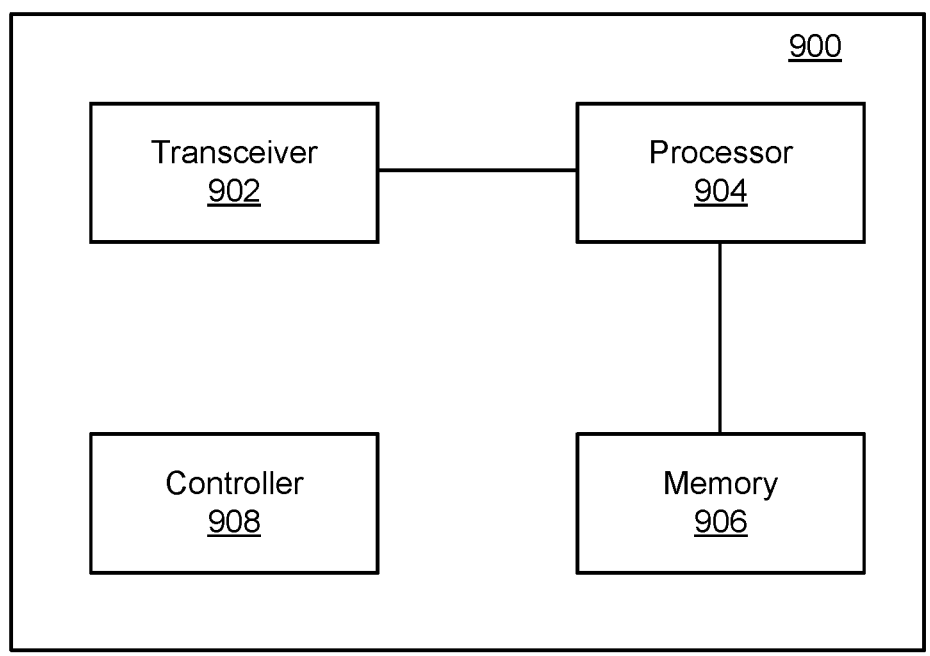
FIG. 9 is a diagram of a wireless station according to an example embodiment.

FIG. 9 is a diagram of a wireless station 900 according to an example embodiment. The wireless station 900 can include an access point, base station 102, gNB, or user equipment 104, according to example embodiments. The wireless station 900 can include, for example, one or more wireless transceivers 902, which can include multiple transmitters and/or transmission antenna ports to transmit signals and multiple receivers and/or receive antenna ports to receive signals. The wireless station 900 also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902. Processor 904 may control transmission of signals or messages over a wireless network, such as the network 100, and may control the reception of signals or messages, etc., via a wireless network (e.g., after being down-converted by wireless transceiver 902, for example). Processor 904 may be programmable and capable of executing software or other instructions stored in memory 906 or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902 may receive signals or data and/or transmit or send signals or data. Processor 904 (and possibly transceiver 902) may control the RF or wireless transceiver 902 to receive, send, broadcast or transmit signals or data.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   transmitting, by a user equipment to a base station, coherence information indicating, based on precoding to be performed in association with transmission, whether a first transmission signal to be transmitted via a first transmission port will be coherent with a second transmission signal to be transmitted via a second transmission port;
   receiving, from the base station, a transmission indication message, the transmission indication message assigning uplink transmission resources and coherence information to the first transmission port and the second transmission port; and
   transmitting, to the base station via the assigned uplink transmission resources, the first transmission signal via the first transmission port and the second transmission signal via the second transmission port, the transmitting including precoding the first transmission signal and the second transmission signal.

2. The method of claim 1, wherein:
   the coherence information indicates, based on precoding to be performed in association with transmission, whether the first transmission signal to be transmitted via a first transmission port will be coherent with the second transmission signal to be transmitted via a second transmission port, whether the first transmission signal to be transmitted via the first transmission port will be coherent with a third transmission signal to be transmitted via a third transmission port, and whether the second transmission signal to be transmitted via the second transmission port will be coherent with the third transmission signal to be transmitted via the third transmission port;
   the transmission indication message assigns uplink transmission resources and coherence information to the first transmission port, the second transmission port, and the third transmission port; and
   the transmitting, to the base station via the assigned uplink transmission resources, comprises transmitting the first transmission signal via the first transmission port, the second transmission signal via the second transmission port, and the third transmission signal via the third transmission port, the transmitting including precoding the first transmission signal, the second transmission signal, and the third transmission signal.

3. The method of claim 2, wherein the first transmission port, the second transmission port, and the third transmission port are configured to transmit the first transmission signal, the second transmission signal, and the third transmission signal simultaneously or sequentially.

4. The method of claim 1, wherein the coherence information is included in an assistance message that indicates transmission coherence associated with precoding to be performed in association with transmitting the first transmission signal, the second transmission signal, and a third transmission signal.

5. The method of claim 1, further comprising:
   determining whether, based on the precoding to be performed in association with transmission, the first transmission signal to be transmitted via the first transmission port will be coherent with the second transmission signal to be transmitted via the second transmission port; and
   precoding the first transmission signal and the second transmission signal in association with transmitting the first transmission signal and the second transmission signal.

6. The method of claim 1, wherein the first transmission signal comprises at least one of a data signal, a control signal, a reference signal, a sounding reference signal, a demodulation reference signal, or a phase tracking reference signal.

7. The method of claim 1, wherein the transmitting includes transmitting the first transmission signal via at least one of a physical uplink shared channel, a physical uplink control channel, or a physical random access channel.

8. The method of claim 1, wherein the user equipment comprises a greater number of reception ports than transmission ports.

9. A non-transitory computer readable storage medium comprising instructions stored thereon that, when executed by at least one processor, are configured to cause a computing system to perform the method of claim 1.

10. The method of claim 1, wherein the coherence information indicates whether the first transmission signal to be transmitted via the first transmission port can be successfully decoded by the base station during overlapping symbols in time with the second transmission signal to be transmitted via the second transmission port.

11. The method of claim 1, wherein the coherence information indicates whether the first transmission signal to be transmitted via the first transmission port can be successfully decoded by the base station via an overlapping frequency band with the second transmission signal to be transmitted via the second transmission port.

12. The method of claim 1, wherein the coherence information indicates whether the first transmission signal to be transmitted via the first transmission port can be successfully decoded by the base station during overlapping symbols in time and via an overlapping frequency band with the second transmission signal to be transmitted via the second transmission port.

13. A method comprising:
    receiving, by a base station from a user equipment, coherence information indicating whether a first transmission signal to be transmitted via a first transmission port will be coherent with a second transmission signal to be transmitted via a second transmission port;
    generating a transmission indication message based on the coherence information, the transmission indication message assigning resources to the first transmission port and the second transmission port so that the first transmission port and the second transmission port can coherently transmit the first transmission signal and the second transmission signal;
    sending the transmission indication message to the user equipment; and
    receiving the first transmission signal and the second transmission signal from the user equipment.

14. The method of claim 13, wherein the coherence information is included in an assistance message that indicates precoding to be performed in association with transmission.

15. The method of claim 13, wherein the first transmission signal is precoded and the second transmission signal is precoded.

16. The method of claim 13, further comprising decoding the first transmission signal and the second transmission signal based on assignments of resources included in the transmission indication message.

17. The method of claim 13, wherein:
the coherence information indicates whether the first transmission signal to be transmitted via the first transmission port will be coherent with the second transmission signal to be transmitted via the second transmission port, whether the first transmission signal to be transmitted via the first transmission port will be coherent with a third transmission signal to be transmitted via a third transmission port, and whether the second transmission signal to be transmitted via the third transmission port will be coherent with the third transmission signal to be transmitted via the third transmission port;
the transmission indication message assigns resources to the first transmission port, the second transmission port, and the third transmission port so that the first transmission port, the second transmission port, and the third transmission port can coherently transmit the first transmission signal, the second transmission signal, and the third transmission signal; and
the method comprises receiving the first transmission signal, the second transmission signal, and the third transmission signal from the user equipment.

18. The method of claim 13, wherein the coherence information indicates whether the first transmission signal to be transmitted via the first transmission port can be successfully decoded by the base station during overlapping symbols in time and via an overlapping frequency band with the second transmission signal to be transmitted via the second transmission port.

19. An apparatus comprising:
at least one processor; and
at least one memory including computer program code;
the at least one memory and the computer program code configured to, with the at least one processor, cause the apparatus at least to:
transmit, by a user equipment to a base station, coherence information indicating, based on precoding to be performed in association with transmission, whether a first transmission signal to be transmitted via a first transmission port will be coherent with a second transmission signal to be transmitted via a second transmission port;
receive, from the base station, a transmission indication message, the transmission indication message assigning uplink transmission resources and coherence information to the first transmission port and the second transmission port; and
transmit, to the base station via the assigned uplink transmission resources, the first transmission signal via the first transmission port and the second transmission signal via the second transmission port, the transmitting including precoding the first transmission signal and the second transmission signal.

20. An apparatus comprising:
at least one processor; and
at least one memory including computer program code;
the at least one memory and the computer program code configured to, with the at least one processor, cause the apparatus at least to:
receive, by a base station from a user equipment, coherence information indicating whether a first transmission signal to be transmitted via a first transmission port will be coherent with a second transmission signal to be transmitted via a second transmission port;
generate a transmission indication message based on the coherence information, the transmission indication message assigning resources to the first transmission port and the second transmission port so that the first transmission port and the second transmission port can coherently transmit the first transmission signal and the second transmission signal;
send the transmission indication message to the user equipment; and
receive the first transmission signal and the second transmission signal from the user equipment.

* * * * *